Jan. 12, 1960 M. SHAPIRO 2,920,730
DRIVE MECHANISM FOR SEWING MACHINES
Filed Sept. 6, 1956 3 Sheets-Sheet 1
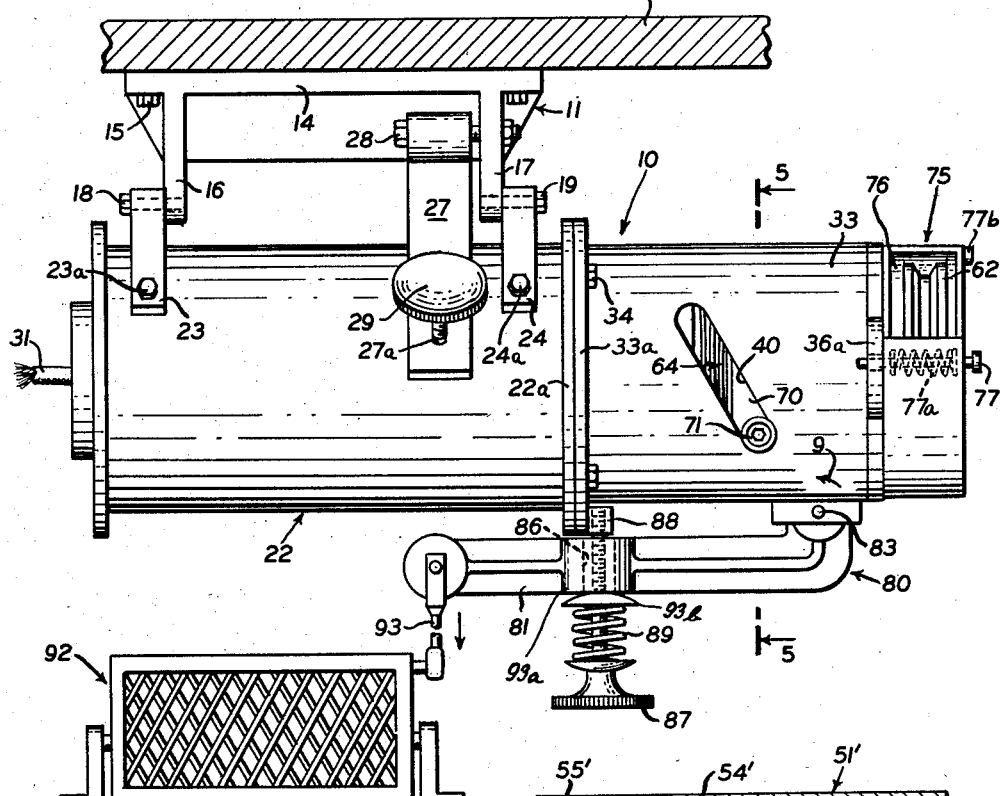
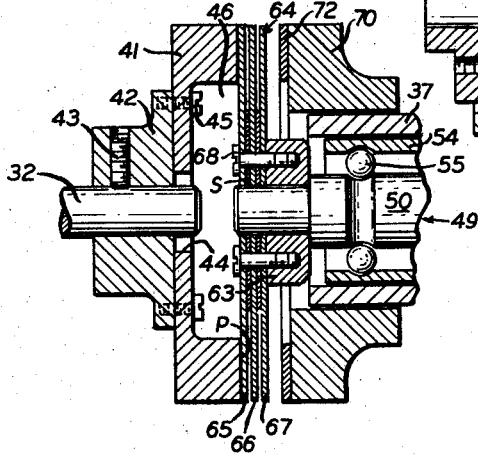
INVENTOR
MORDECAI SHAPIRO.
BY Mock + Blum
ATTORNEYS.

Jan. 12, 1960  M. SHAPIRO  2,920,730
DRIVE MECHANISM FOR SEWING MACHINES
Filed Sept. 6, 1956  3 Sheets-Sheet 2

INVENTOR
MORDECAI SHAPIRO.
BY Mock + Blum
ATTORNEYS.

Jan. 12, 1960                M. SHAPIRO                    2,920,730
                    DRIVE MECHANISM FOR SEWING MACHINES
Filed Sept. 6, 1956                                    3 Sheets-Sheet 3
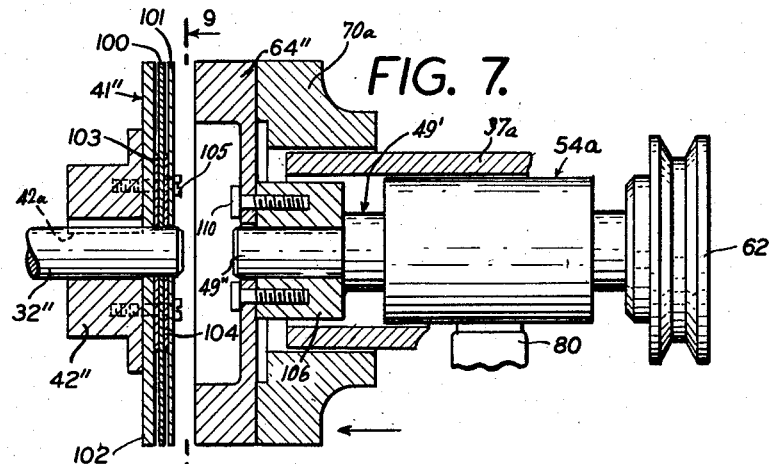
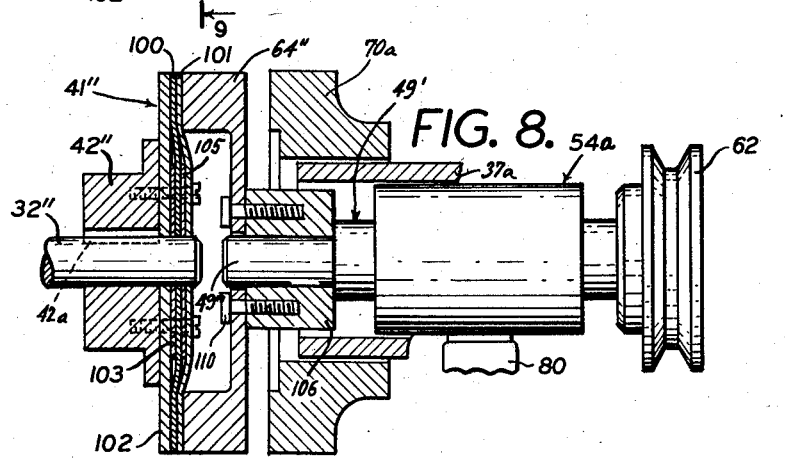
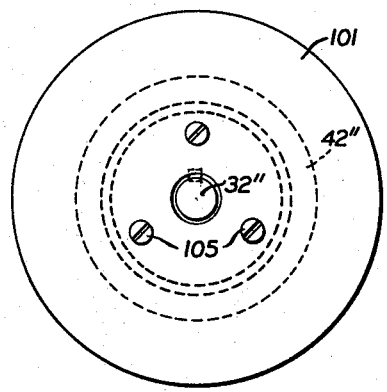
INVENTOR
MORDECAI SHAPIRO.
BY
*Mock + Blum*
ATTORNEYS.

United States Patent Office 2,920,730
Patented Jan. 12, 1960

2,920,730

DRIVE MECHANISM FOR SEWING MACHINES

Mordecai Shapiro, Merrick, N.Y., assignor to National Safety Table Company, Merrick, Long Island, N.Y.

Application September 6, 1956, Serial No. 608,376

4 Claims. (Cl. 192—18)

My invention relates to a new and improved drive mechanism for driving various machines, such as sewing machines.

It is well known to provide a drive mechanism which has a longitudinal motor shaft or power shaft; a longitudinal driven shaft or transmission shaft; to provide for a relative longitudinal movement between said shafts, and to provide said shafts with dry friction clutch members which are coupled or uncoupled by the relative longitudinal movement between said shafts.

Such dry friction clutch coupling between said shafts, according to prior practice, has resulted in irregular and jerky coupling and operation, especially when the motor shaft or power shaft and the driven shaft were rotated at high speed, such as 3,600 revolutions per minute, which is the usual speed of a motor shaft or power shaft in a transmission for a sewing machine. In such high-speed rotation, it has been necessary to provide dynamic and static balance for the motor shaft, and also for the driven shaft. The usual dry friction clutch wears fairly rapidly, which results in a jerky drive, thus injuring the sensitive parts of a sewing machine, and resulting in objectionable noise.

According to one feature of my invention, I provide one of said shafts with a rigid and dry friction block, which preferably and optionally has an annular friction face which is concentric with the common longitudinal axis of both the motor shaft and the driven shaft.

The shaft which is provided with said dry, rigid, friction block, may be either the power shaft or the driven shaft. Preferably, said dry, rigid friction block is fixed rigidly to the driven shaft. This dry, rigid, friction block may be made of any suitable friction material, such as the material which is used to make rigid brake blocks. The well-known rigid "Raybestos" illustrates such material. Such rigid friction material usually includes asbestos powder or asbestos fiber, an asbestos cement, and other ingredients, such as silica sand, coke dust, a drying oil, etc.

This dry friction block is one member of the dry clutch. The other member of the dry clutch includes a plurality of dry, resilient and flexible metal plates. Due to their resilience, said metal plates have selected normal shapes, to which they return after being flexed. Without limitation thereto, said normal shapes may be flat, disc shapes. The faces of said metal plates may be fairly smooth, but said metal plates have a sufficient high friction to act as friction coupling members. The central parts of said plates are provided with intermediate spacers, which may be flat, rigid metal discs. The central parts of said plates and said spacers are fixed rigidly to the respective shaft, either the motor shaft or the driven shaft, so that said plates and spacers rotate in accurate unison with the respective shaft.

By means of these spacers, said plates are provided with outer peripheral zones or portions, which are freely flexible and resilient in a direction parallel to the axis of the shaft to which said plates are fixed. These outer peripheral portions may be of annular shape.

These outer peripheral zones or portions are axially alined with the annular friction face of the rigid friction block. Said outer peripheral zones or portions preferably extend radially inwardly of the annular friction face of the rigid friction block.

The metal plate which directly contacts with the annular friction face of the rigid friction block, when the clutch is coupled, is preferably made of brass. The other metal plate or plates can be made of aluminum or aluminum alloy or other suitable material.

The clutch can be coupled by longitudinally shifting the driven shaft towards the motor shaft.

If the rigid friction block is connected to the motor shaft, this results in bending or flexing said resilient and flexible outer peripheral zones axially away from the annular friction face of the friction block. When the clutch is fully coupled, one of said bent outer peripheral zones is in frictional contact with the annular face of the rigid friction block, and all of said axially bent outer peripheral zones are in frictional contact with each other at their adjacent faces, thus distributing the frictional driving force over all the outer peripheral zones.

If the flexible metal plates are connected to the motor shaft, they are provided with a rigid abutment which is fixed to said motor shaft. The flexible metal plates are located intermediate said rigid abutment and the rigid friction block, which is fixed to the driven shaft in this case. In such case, the flexible outer peripheral zones are bent and longitudinally clamped between said rigid abutment and the annular friction face of the rigid block, when the clutch is coupled, and the adjacent faces of the said outer peripheral zones are then in frictional contact. This also distributes the driving force over all the outer peripheral zones.

Depending upon the driving force, the transmission may have two or three or more flexible metal plates.

It is thus possible to provide a dry clutch which has a plurality of thin metal plates, upon which the frictional driving force is distributed. I can thus use thin, resilient and flexible metal plates or metal members of normal flat shape or of other normal shapes. Thus, if I used only a single metal plate of the low thickness later mentioned herein, such single metal plate would not provide the required friction, and it would be bent permanently out of normal shape by the driving force, if such single metal plate efficiently transmitted the entire driving force.

The selection of metals and the finish of their surfaces, in order to transmit a frictional force, is well known. These factors are described, as one example, in the 1941 edition of "Mechanical Engineers' Handbook," published by McGraw-Hill Book Company, Inc.

I also provide a rigid brake block, which may be made of friction material which has an annular contact face, or which may be made of any material and which has an annular friction strip.

If the flexible plates are fixed to the driven shaft, the outer peripheral zone of one of said plates contacts with the fixed and rigid brake at the end of the uncoupling stroke of the driven shaft. At the end of said uncoupling stroke, all the outer peripheral zones are bent axially away from the fixed and rigid brake, and the adjacent faces of said outer peripheral zones are then in frictional braking contact. This distributes the braking force over all the peripheral zones.

If the flexible metal plates are fixed to the motor shaft, and the rigid clutch block is fixed to the driven shaft, said rigid clutch block is in braking contact with the fixed and rigid brake at the end of the uncoupling stroke of the driven shaft.

Whenever I refer to longitudinally shifting the driven shaft relative to the power shaft or motor shaft, I include any relative coupling or uncoupling movement between said shafts, and I also include any relative coupling or uncoupling movement between the respective clutch members, if the shafts are not longitudinally shifted.

I also provide improved means for longitudinally shifting the brake in various respective fixed positions.

I also provide an improved adjustment for a spring which automatically uncouples the clutch and applies the braking force, when the clutching force is released by the operator.

I also provide an assembled casing, in which all the parts of the transmission are located, said assembled casing being turnable about a longitudinal axis by gravity or by applied force, in order to apply sufficient tension to the belt which connects the driven shaft to the sewing machine or other machine.

Numerous additional improvements are disclosed in the annexed description and drawings, which illustrate three embodiments of my invention.

Fig. 1 is a front elevation of the first embodiment, associated with the table of a sewing machine.

Fig. 4 is a section similar to Fig. 3, showing the clutch just before the commencement of the coupling action. When the clutch is finally coupled, the peripheral, spaced parts of the flexible and resilient metal plates are pressed against each other and are bent longitudinally towards the annular face of the rigid friction member, as illustrated in Fig. 8.

Fig. 6 is a longitudinal sectional view which illustrates the second embodiment, which has a modified driven shaft which can be used either in the first or third embodiments.

Fig. 7 is a longitudinal sectional view of the preferred third embodiment, in which the metal plates are fixed to the motor shaft or power shaft. It shows the clutch in uncoupled and braked position.

Fig. 8 is similar to Fig. 7, showing the clutch in its coupled position, in which the flexible and resilient peripheral parts of the metal plates are pressed against each other by the peripheral parts of a rigid member fixed to the motor shaft and of a rigid, friction clutch member fixed to the driven shaft.

Fig. 9 is a transverse elevation on the line 9—9 of Fig. 7.

*First embodiment—Figs. 1-5*

Figure 2:
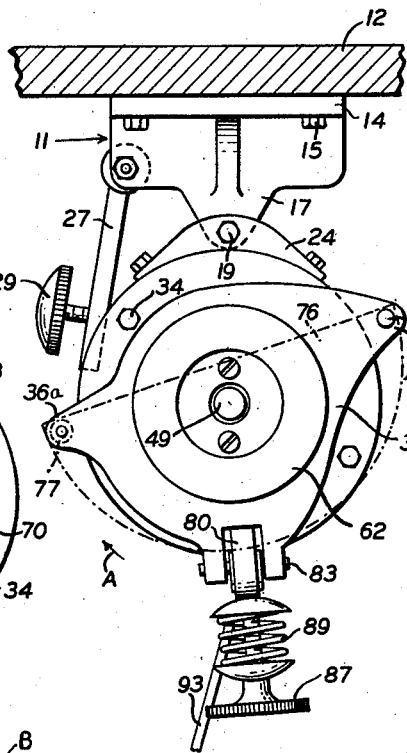
Fig. 2 is an end elevation of Fig. 1, at the righthand side of Fig. 1.

The rigid bracket 11 has an integral top plate 14. Said rigid plate 14 is fixed by bolts 15 to the table 12 of a sewing machine. Said rigid plate 14 is integral with rigid, vertical arms 16 and 17. Rods or bars 23 and 24 are respectively pivoted to arms 16 and 17, by respective longitudinal and horizontal pivots 18 and 19, whose longitudinal axes are on the same longitudinal, horizontal line.

Another rigid arm or bar 27 is pivoted to arm 17 by a longitudinal and horizontal pivot 28, whose longitudinal axis is above the common longitudinal horizontal axis of pivots 18 and 19.

Said arm 27 has a vertical slot 27a.

Said pivoted rods or bars 23 are fixed to a longitudinal casing or housing 22 by respective bolts 23 and 24, so that longitudinal housing 22 is laterally turnable about the common longitudinal axis of pivots 18 and 19.

A clamping screw 29 has a threaded shank which extends through slot 27a of rod 27. Said threaded shank of screw 29 engages the thread of a recess in the wall of housing 22. Said threaded shank of clamping screw 29 is easily movable in the slot 27a of the bar 27. Hence, when the head of clamping screw 29 is spaced from bar 27 and said screw is in loose position, the housing 22 can be turned laterally in either direction around the longitudinal horizontal axis of pivots 18 and 19, while the threaded shank of clamping screw 29 engages the thread of the recess of the wall of housing 22. When housing 22 is thus laterally turned or pivoted around the common, longitudinal and horizontal axis of pivots 18 and 19, the threaded shank of clamping screw 29 slides or moves easily in the slot 27a of bar 27. This slot 27a may be closed at both ends thereof, in order to limit the sliding movement of the threaded shank of clamping screw 29.

The clamping screw 29 may be adjusted to its loose position so that its head is spaced from bar 27, in which case gravity biases the housing 22 to its bottom position. When housing 22 is in its bottom position, the bars or rods 23 and 24 are vertical.

If desired, the housing 22 can be laterally turned or pivoted around the common axis of pivots 18 and 19 to any selected lateral position, in which bars 23 and 24 are inclined to the vertical direction and the clamping screw 29 can then be turned until its head clamps against the bar 27, in order to maintain housing 22 in its laterally turned position. Said casing or housing 22 is fixed rigidly to an associated longitudinal casing or housing 33. Said housings 22 and 33 are an assembled housing.

Figure 3:
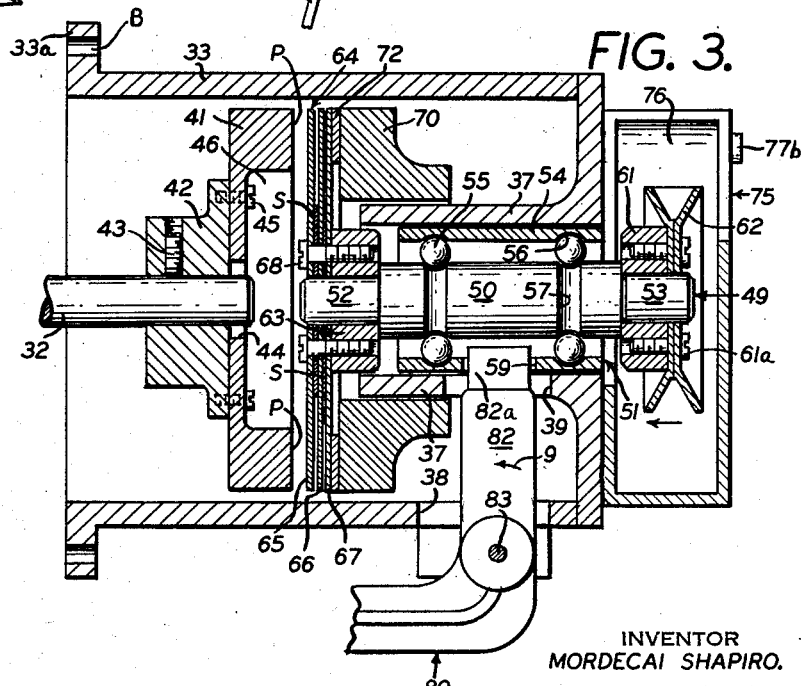
Fig. 3 is a detail vertical, longitudinal section, which shows the clutch in uncoupled position, and shows the commencement of the braking action.

For this purpose, the housings 22 and 33 are provided with respective circumferential, annular flanges 22a and 33a, which have pairs of adjacent longitudinal bores, as illustrated by the longitudinal bores B of flange 33a in Fig. 3. These bores B are arranged in longitudinally alined pairs, through which clamping bolts 34 pass, in order to clamp housings 22 and 33 rigidly to each other, so that they are turnable in unison around pivots 18 and 19, as a single assembled housing.

A motor, such as an electric motor, is located within and fixed to housing 22. This motor is not shown, as it is conventional. Fig. 1 shows the flexible cable 31, which supplies electricity to the electric motor. This motor has a longitudinal motor shaft 32. The shaft 32 may be driven in any manner. It has suitable bearings in housing 22.

As shown in Figs. 3 and 4, a collar 42 is releasably fixed to motor shaft 32 by one or more clamping screws 43.

Said motor shaft 32 extends through the central bore of a rigid clutch block or clutch member 41, which is made of any suitable rigid, friction material, such as "Raybestos." This clutch member 41 has an annular recess 46, which is concentric with shaft 32, and an annular, frictional engaging face P which is also concentric with shaft 32. Said friction clutch member 41 is fixed to collar 42 by longitudinal, releasable screws 45.

As shown in Fig. 3, said clutch block or member 41 is located within the housing or casing 33.

This motor shaft 32 is accurately alined with a longitudinal driven shaft 49, which extends beyond one end of the housing or casing 33.

Said driven shaft 49 is longitudinally shiftable relative to housing 33.

For this purpose, said housing 33 is provided with an internal, integral, guide 37, whose inner and outer walls have the shape of respective longitudinal cylinders which are concentric with the common longitudinal axis of driven shaft 49 and motor shaft 32.

An inner, cylindrical and longitudinally shiftable sleeve 54 has an outer cylindrical wall which fits accurately and slidably and turnably against the inner cylindrical wall of guide 37.

This slidable and cylindrical sleeve 54 is part of a bearing 51 for the driven shaft 49.

As shown in Fig. 3, said driven shaft 49 has an intermediate or median cylindrical section 50, and reduced, cylindrical inner and outer end-sections 52 and 53.

As also shown in Fig. 3, the inner cylindrical face of the slidable sleeve 54 has transverse, continuous circumferential grooves 57. Anti-friction balls 55 fit partially in said grooves 56 and 57, so that motor shaft 32 and driven shaft 49 are maintained in accurate longitudinal alinement, with a common horizontal and longitudinal axis of rotation.

By means of these anti-friction balls 55, the sleeve 54 and the driven shaft 49 can be accurately longitudinally shifted in unison, and the driven shaft 49 is also provided with an anti-friction bearing relative to sleeve 54, which may have little or no turning movement relative to guide 37 of casing 33.

A longitudinal collar 63 is rigidly fixed to the inner end-section 52 of driven shaft 49, as by a press fit or in any suitable manner.

The reference numeral 64 indicates a group of thin, flexible and resilient metal plates 65, 66, 67. The invention is not limited to the use of three plates. Each said plate 65, 66, 67 has a central perforation. Respective spacers S are located between plates 65—66 and between plates 66—67. Each said spacer S also has a central perforation.

These spacers S may be rigid and identical.

Without limitation to the specific details stated herein, certain dimensions and details are stated, as one practical working example, for transmitting horsepower, when shafts 32 and 49 are rotated at 3600 revolutions per minute.

Said plates 65, 66, 67 have an outer diameter of four inches, and an inner diameter of ⅝ inch. The spacers S, which may be rigid, have an outer diameter of two inches, and the same inner diameter as plates 65, 66, 67.

The annular face P of the rigid frictional block 41 has an outer diameter of four inches and an inner diameter of ⅝ inch.

The collar 63, which is later more fully described, has an outer diameter of 1½ inch, and a planar face adjacent place 67.

The thickness of spacers S is .010 inch.

Plate 65 is made of brass, with a thickness of .032 inch.

Plate 66 is made of aluminum or aluminum alloy, with a thickness of .032 inch.

Plate 67 is made of aluminum or aluminum alloy, with a thickness of .094 inch.

These flexible and resilient plates 65, 66, 67 have fairly smooth surfaces, but they have a sufficient coefficient of friction to uniformly distribute the driving force and braking force.

The plate 65, which directly abuts face P, is preferably made of brass, which may have a lower coefficient of friction than plates 66 and 67. Said plates 66 and 67 can also be made of brass, but aluminum or aluminum alloy or other suitable metal may be used.

The collar 63 is fixed rigidly to the section 52 of driven shaft 49, as by a press fit or other means.

Said section 52 fits closely in the central perforations of plates 65, 66, 67 and of spacers S.

Longitudinal clamping screws 68, which extend through and fit in bores of plates 65, 66, 67 and spacers S, rigidly fix and clamp the central parts of the rigid spacers S and the central parts of plates 65, 66, 67 to collar 63, so that said spacers and plates rotate in accurate unison with driven shaft 49.

The outer, annular, peripheral parts of plates 65, 66, 67, which extend radially beyond spacers S, are free to flex. Due to their resilience, said outer parts of plates 65, 66, 67 return to their selected normal shape when the flexing force is released. In this illustration, said plates 65, 66, 67 have normal, flat disc shapes, but they may have any normal shapes, as long as they provide and distribute the necessary frictional coupling and braking force.

As above noted, Fig. 4 shows the peripheral parts of plates 65, 66, 67, just before the coupling action begins. When driven shaft 49 is longitudinally shifted to the left of its position in Fig. 4, the peripheral part of plate 65 is forced against face P, said peripheral part is flexed axially to the right to contact with the peripheral part of plate 66, which is also flexed to the right to contact with and to flex the peripheral part of plate 67 to the right. In their flexed or bent form, the outer portions of plates 65, 66, 67 have frusto-conical shapes, and their adjacent faces are in frictional contact.

As shown in Fig. 3, a rigid collar 61 is rigidly fixed to the outer reduced section 53 of transmission shaft 49, as by a press fit or in any suitable manner. The halves of a conventional split pulley 62 are fixed rigidly to said collar 61 by longitudinal screws 61a.

In using the mechanism illustrated herein, said split pulley 62 is connected by a conventional endless belt, not shown, to the conventional driving pulley of the sewing machine or other machine. This machine and its pulley are not shown, as they are conventional.

A protective cover 75 for said belt has a top and side opening 76, through whose top said drive belt extends upwardly to the pulley of the sewing machine or other machine.

This cover 75 is pivotally connected to casing 33.

As shown in Fig. 2, casing 33 is provided with a pair of integral lugs 36a. Said cover 75 is pivotally connected to one of said lugs 36a by a horizontal and longitudinal pivot pin 77b. Figs. 1-3 show the latched position of cover 75, in which it is releasably held by a removable and longitudinal latch pin 77, which extends through a bore of cover 75 and through a bore of the respective lug 36a of casing 33.

As shown in Fig. 1, a compression spring 77a is located around the shank of latch pin 77. One end of spring 77a abuts cover 75. The other end of spring 77a is connected to the shank of latch pin 77, so that latch pin 77 is biased to the latching position of Fig. 1 by spring 77a.

When latch pin 77 is pulled longitudinally outwardly from said latching position, it is pulled out of the bore of the respective lug 36a, so that cover 75 can turn downwardly about the horizontal axis of pivot pin 77b to an open position, in which the belt can be easily applied to or removed from pulley 62. When latch pin 77 is thus pulled out of its latching position, it remains assembled with cover 75, and it turns with cover 75 around pivot 77b.

When a drive belt is to be installed, or removed and replaced, the cover 75 is released from casing 33, and said cover 75 is turned downwardly around pivot 77 from its latched position of Figs. 1-3.

At this time, the clamping screw 29 is in its loose position. The operator turns the connected casings 22 and 33 towards him, around the axis of pivot pins 18 and 19, as indicated by the arrow A in Fig. 2.

The endless belt can then be easily placed upon pulley 62 and upon the associated drive pulley of the sewing machine or other machine. The operator then releases the connected casings 22 and 23, which turn by gravity in a direction reverse to arrow A. When the belt is thus installed, the released casings 22 and 23 thus turn by gravity to a position in which rods 23 and 24 remain forwardly inclined from vertical position, so that the weight of casings 22 and 33 and of the parts therein, may impose suitable driving tension upon the drive belt. If greater tension on the drive belt is desired, the operator additionally turns the connected casings 22 and 23 away from him, in a direction reverse to arrow A, until the tension on the drive belt is suitably increased, and he then tightens clamping screw 29, in order to clamp the connected casings 22 and 33 in their adjusted position. That is, the length of the endless belt is less than the vertical distance between the pulley of the sewing machine and the pulley 62, when rods 23 and 24 are in depending vertical position. After the tension on the drive belt has been thus selected, the cover 75 is turned to its latching position, and the assembled latching pin 77 is moved to its latching position by spring 77a.

As shown in Fig. 3, a rigid brake block 70 fits closely and slidably upon the outer cylindrical face of the cylindrical guide 37. This rigid brake block 70 is provided in this embodiment with an annular friction strip 72, which is made of suitable friction material, and which is fixed to said brake block 70.

Figure 5:
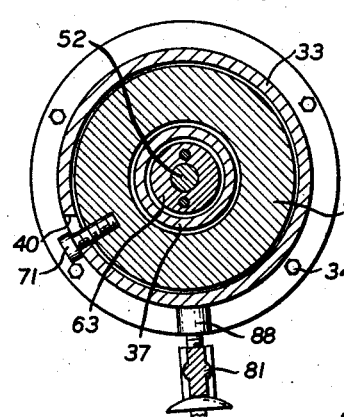
Fig. 5 is a transverse section on the line 5—5 of Fig. 1.

As shown in Fig. 1 and Fig. 5, the housing 33 has a slot 40 which is inclined to the common longitudinal axis of the transmission shaft 49 and motor shaft 32. The clamping screw 71 has a threaded shank which extends slidably through said slot 40. This threaded shank of clamping screw 71 engages the thread of a recess of brake block 70. When clamping screw 71 is loosened, without disengaging it from brake block 70, the threaded shank of said clamping screw 71 can be shifted in slot 40, thus turning brake block 70 around a longitudinal axis, and also longitudinally shifting brake block 70 to a selected adjusted longitudinal position relative to the plate 67 of the group 64. The clamping screw 71 is then tightened, in order to clamp brake block 70 in its adjusted longitudinal position.

Hence, when the driven shaft 49 and its flexible plates are moved in unison, longitudinally away from motor shaft 32, the outer face of the plate 67 of group 64 contacts with the friction strip 72, which is fixed to the fixed brake block 70, thus braking the driven shaft 49. When the driven shaft 49 is in final braking position, the outer, flexible parts of all the plates of group 64 are flexed and contact with each other, to provide a braking effect, and said outer parts then have frusto-conical shapes and they frictionally abut each other.

Fig. 3 shows the position of plates 65, 66, 67, just when the braking action begins.

As the brake strip 72 wears, the longitudinal adjustment of the brake member 70 can also be regulated in order to compensate for wear. Thus, if screw 71 is shifted from its position of Fig. 1, the brake 70 is longitudinally shifted to the left, to compensate for wear of strip 72.

As shown in Fig. 3, the sleeve 54 has a vertical opening 59 and the tubular guide 37 has a larger vertical opening 39, and the casing 33 has a corresponding and still larger vertical opening. A rod 82 is pivoted at 83 to a lug of a casing 33. This rod 82 extends through the opening 39 of the sleeve 37. Said rod 82 has a head 82a which fits fairly closely in the opening 59 of the shiftable sleeve 54. Said rod 82 has an angular lever extension 80—81, which is connected by a link 93 to a pivoted operating treadle 92. When the bar or rod 82 is turned in the direction of arrow 9 of Fig. 3, the head 82a longitudinally shifts the sleeve 54 and therefore simultaneously shifts the shaft 49 so as to move the group of discs 65, 66, 67, to the final coupling position.

A spring is provided for automatically returning the driven shaft 49 to the position shown in Fig. 3, when the pedal 92 is released, and for applying the braking force. As illustrated in Fig. 1, a lug 88 is fixed to the flange 33a of the casing 33. The threaded end of a pin 86 is fixed to said lug 88. Said pin 86 extends through the bore of a hollow collar 93a of the lever 80. A washer 93b is mounted upon a smooth part of pin 86. A compression spring 89 is mounted on the smooth part of pin 86. Said spring can be held in a desired compressed position by means of a cap 87 which is threaded on the respective threaded end of pin 86. As viewed in Fig. 1, this compression spring 89 exerts pressure which biases the lever-extension 80—81 to turn counter-clockwise around pivot 83, thus automatically longitudinally shifting the sleeve 54 and driven shaft 49 to the uncoupled position of Fig. 3. The exposed location of the cap 87 and spring 89 makes it possible very easily and efficiently to adjust the compression of the return biasing spring 89 in order to suit the convenience of the individual operator, and to select the braking force.

*Second embodiment—Fig. 6*

In this embodiment, the driven shaft 95, which may be either hollow or solid, takes the place of the driven or transmission shaft 49, or the driven shaft of the third embodiment. This driven shaft 95 lowers the cost of manufacture and facilitates assembly. This driven shaft 95 has reduced end-portions 97b and 98b. The plates of the group 64 can be mounted and clamped to the end portion 97b, and the screws 68 of the first embodiment can be screwed into the tapped longitudinal recesses of the section 97 of the driven shaft 95. The pulley 62 can be fixed to the section 98b, by means of said screws 61a, which enter the tapped recesses of section 98. The bearing 51' replaces the bearing 51 of the first embodiment and the sleeve 54' takes the place of sleeve 54 of the first embodiment. This sleeve 54' is slidable within and turnable relative to the guide 37 of the first embodiment. The anti-friction balls 55' have the same function as the balls 55.

*Third embodiment*

In this embodiment, a rigid collar 42" is fixed to motor-shaft 32". For this purpose, collar 42" may have one or more flat extensions or keys 42a, which fit closely in longitudinal recesses of motor shaft 32". Conventional clamping screws can be used for rigidly fixing collar 42" to motor shaft 32".

In this example, a flat, rigid abutment plate 102, two flexible plates 100 and 101, and two rigid spacers 103 and 104 are rigidly clamped to collar 42" by longitudinal clamping screws 105, which operate like the clamping screws 68. These plates 102, 100, 101 provide a group 41".

In this example, the flat and rigid abutment disc 102, which may optionally be somewhat bendable and resilient, is made of aluminum or aluminum alloy, with a thickness of 0.092 inch. In this example, the resilient and flexible plate 100 is made of aluminum, with a thickness of 0.033 inch. In this example, the resilient and flexible plate 101 is made of brass, with a thickness of 0.038 inch. Said perforated plates 102, 100, 101 have outer diameters of 4 inches, and inner diameters of ⅝ inch. The rigid, disc-shaped spacers 103 and 104 are made of steel, with an outer diameter of 2 inches. The plates 102, 100, 101 and the spacers 103 and 104 have respective central perforations, which fit closely on motor shaft 32". The thickness of spacers 103 and 104 is .010 inch.

In this embodiment, the flexible and resilient plates 100 and 101 have normal flat disc-shapes, but the invention is not limited to said normal shapes.

Fig. 8 shows the flexed shapes of the peripheral parts of plates 100 and 101, when the clutch is fully coupled. The peripheral friction parts of plates 102, 100, 101 are also fairly smooth. As shown in Fig. 8, the peripheral parts of plates 100 and 101 are clamped between rigid plate 102 and the rigid friction block 64".

The driven shaft 49' also has reduced end-portions. The shift lever 80 operates as in the first embodiment, in order to shift the longitudinally shiftable sleeve 54a, which corresponds to sleeve 54 of the first embodiment. The internal ball-bearing of the first embodiment is used in this third embodiment.

A collar 106 is rigidly fixed to section 49" of driven shaft 49'.

The driven and rigid friction clutch block 64", which can also be made of "Raybestos" is fixed to collar 106 by longitudinal screws 110. This driven clutch block 64" also has a central recess, which is concentric with the common axis of shafts 32' and 49'.

In this embodiment, the rigid clutch block 64" is pressed against the annular face of brake block 70a in the braking position.

I claim:

1. A power transmitter which comprises a support and a casing, a longitudinal motor shaft and a longitudinal driven shaft supported in bearings in said casing, said shafts having a common longitudinal axis, one of said shafts being longitudinally shiftable relative to the other shaft, a rigid friction clutch-member block fixed to one of said shafts, said block having an annular friction face, the other shaft having a plurality of axially spaced flexible plates fixed thereto, adjacent plates having rigid spacers of smaller radius than said annular friction face with flexible peripheral zones, said peripheral zones being longitudinally alined with said annular friction face, the shiftable shaft being shiftable towards the other shaft to a coupling position in which said friction face contacts with the peripheral zone of the next-adjacent flexible plate and all said adjacent peripheral zones contact frictionally with each other.

2. A power transmitter according to claim 1, in which said friction face is annular and at the outer periphery of said rigid friction block, and said block has a longitudinal recess radially inwardly of said annular friction face, the central parts of said plates being located in said recess in said coupling position.

3. A power transmitter which comprises a casing adaptable for mounting on the end of a motor having a drive shaft extending therefrom, said casing having an exterior end wall with an inwardly projecting bearing sleeve, an axially slidable bearing in said bearing sleeve, a driven shaft rotatably mounted in said slidable bearing in alignment with said drive shaft, friction clutch means between said shafts operated by sliding said slidable bearing and driven shaft toward said drive shaft, said clutch means comprising annular axially opposed friction members on the adjacent ends of said shafts, a third annular friction member slidably adjustable on said bearing sleeve for cooperation with the outer face of the annular friction member on said driven shaft to provide a brake when the driven shaft is moved away from said drive shaft, one of said axially opposed annular friction members being comprised of a plurality of aligned plates carried by one of said shafts, and spacers between said plates, said plates having flexible peripheral portions to provide successively greater friction between said friction members as additional portions are brought into mutual contact by continued movement of said driven shaft toward said drive shaft with increasing pressure until the peripheral portions of all the plates are pressed together.

4. A power transmitter according to claim 1 wherein the plates are fixed to the motor shaft and the driven shaft carries said friction clutch-member block, said flexible plates being located longitudinally between said rigid clutch-member block and said friction face, said peripheral zones of said plates being clamped between said rigid clutch-member block and said friction face in coupling position.

References Cited in the file of this patent

UNITED STATES PATENTS

| | | |
|---|---|---|
| 1,330,393 | Rae | Feb. 10, 1920 |
| 1,382,133 | Spencer et al. | June 21, 1921 |
| 1,510,123 | Wemp | Sept. 30, 1924 |
| 1,515,284 | Stahl | Nov. 11, 1924 |
| 2,150,867 | Voigt | Mar. 14, 1939 |
| 2,544,768 | Schulder | Mar. 13, 1951 |
| 2,609,075 | Schulder | Sept. 2, 1952 |
| 2,646,151 | Wellman et al. | July 21, 1953 |
| 2,680,504 | Schweda | June 8, 1954 |
| 2,702,106 | Strahota | Feb. 15, 1955 |
| 2,703,369 | Voigt | Mar. 1, 1955 |
| 2,763,352 | Turner | Sept. 18, 1956 |
| 2,822,903 | Turner | Feb. 11, 1958 |
| 2,827,990 | Hunt | Mar. 25, 1958 |
| 2,843,236 | Hunt | July 17, 1958 |